United States Patent
Takayama

(10) Patent No.: US 9,764,737 B2
(45) Date of Patent: Sep. 19, 2017

(54) METHOD AND DEVICE FOR CALCULATING VEHICLE SPEED

(71) Applicant: Furuno Electric Co., Ltd., Nishinomiya (JP)

(72) Inventor: Yoji Takayama, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/957,318

(22) Filed: Dec. 2, 2015

(65) Prior Publication Data

US 2016/0159354 A1  Jun. 9, 2016

(30) Foreign Application Priority Data

Dec. 3, 2014 (JP) ................................ 2014-244918

(51) Int. Cl.
    *B60W 30/18* (2012.01)
    *G01S 19/52* (2010.01)

(52) U.S. Cl.
    CPC ............ *B60W 30/18* (2013.01); *G01S 19/52* (2013.01); *B60W 2520/10* (2013.01)

(58) Field of Classification Search
    CPC ........... B60W 40/105; B60W 2420/503; G01S 19/40; G01S 19/52
    See application file for complete search history.

(56) References Cited

U.S. PATENT DOCUMENTS

| 2011/0098882 A1* | 4/2011 | Sugisawa ................ G01L 17/00 701/33.4 |
| 2011/0118935 A1* | 5/2011 | Shiozawa ........... B60W 40/068 701/33.4 |

FOREIGN PATENT DOCUMENTS

| JP | 2647342 B2 | 8/1997 |
| JP | 4734329 B2 | 7/2011 |

* cited by examiner

*Primary Examiner* — Redhwan K Mawari
*Assistant Examiner* — Anshul Sood
(74) *Attorney, Agent, or Firm* — Alleman Hall Creasman & Tuttle LLP

(57) ABSTRACT

A vehicle speed calculating device is provided. The device includes a first vehicle speed calculating module configured to calculate a first vehicle speed based on a vehicle speed pulse count of a vehicle, a second vehicle speed calculating module configured to calculate a second vehicle speed based on positioning signals broadcasted from positioning satellites, an acceleration acquiring module configured to acquire an acceleration detected by an acceleration sensor provided to the vehicle, an estimating module configured to estimate a speed error based on a correlative relationship of a difference value between the first and second vehicle speeds with the acceleration, and a correcting module configured to correct the first vehicle speed based on the speed error.

6 Claims, 6 Drawing Sheets

METHOD AND DEVICE FOR CALCULATING VEHICLE SPEED

CROSS-REFERENCE TO RELATED APPLICATION(S)

This application claims priority under 35 U.S.C. §119 to Japanese Patent Application No. 2014-244918, which was filed on Dec. 3, 2014, the entire disclosure of which is hereby incorporated by reference.

TECHNICAL FIELD

This disclosure relates to a method and device for calculating a vehicle speed based on a vehicle speed pulse count.

BACKGROUND OF THE INVENTION

Conventionally, navigation devices which calculate a traveling distance of a vehicle by using vehicle speed pulses are disclosed (e.g., see JP2647342B). The navigation device of JP2647342B acquires external signals from a wheel speed sensor, a gyroscope and a GPS receiver. These external signals are transmitted to a position detecting module of the navigation device. The position detecting module calculates a traveling distance of a vehicle as follows. The position detecting module applies an azimuth detected by the gyroscope to a vehicle speed pulse count detected by the wheel speed sensor to calculate a quadrature component of the vehicle speed pulse count. Based on a position of the vehicle detected by the GPS receiver, the position detecting module calculates a linear distance by which the vehicle has traveled. The position detecting module then compares the quadrature component with the linear distance to calculate a pulse distance coefficient (scale factor). Finally, the position detecting module calculates the traveling distance of the vehicle by using a product of the pulse distance coefficient and the vehicle speed pulse count.

Moreover, azimuth calculating devices which calculate an azimuth of a vehicle are conventionally disclosed (e.g., see JP4734329B). The azimuth calculating device of JP4734329B calculates an azimuth of a vehicle as follows. The azimuth calculating device multiplies an output value of an angular velocity sensor by a gain value to calculate an angular velocity before correction. The azimuth calculating device then multiplies the angular velocity before correction by a correction coefficient to calculate a corrected angular velocity of the vehicle. Finally, the azimuth calculating device calculates the azimuth of the vehicle based on the angular velocity of the vehicle. The correction coefficient is updated by comparing the calculated azimuth of the vehicle with an azimuth obtained by using a GPS.

The navigation device of JP2647342B calculates the scale factor generally by dividing the traveling distance of the vehicle by the vehicle speed pulse count. However, when the vehicle accelerates or decelerates, since a drive shaft of the vehicle is distorted and/or the diameters of wheels are varied due to load fluctuation on the wheels, the relationship between the traveling distance of the vehicle and the vehicle speed pulse count changes. Therefore, in the navigation device of JP2647342B, when the vehicle accelerates or decelerates, an error may be caused in the scale factor and, further, an error may be caused in the traveling distance and the speed of the vehicle which are calculated based on the vehicle speed pulse count.

SUMMARY OF THE INVENTION

The purpose of this disclosure relates to providing a method and device for calculating a vehicle speed at high accuracy based on a vehicle speed pulse count even when the vehicle accelerates or decelerates.

According to one aspect of this disclosure, a vehicle speed calculating device is provided. The vehicle speed calculating device includes a first vehicle speed calculating module configured to calculate a first vehicle speed based on a vehicle speed pulse count of a vehicle, a second vehicle speed calculating module configured to calculate a second vehicle speed based on positioning signals broadcasted from positioning satellites, an acceleration acquiring module configured to acquire an acceleration detected by an acceleration sensor provided to the vehicle, an estimating module configured to estimate a speed error based on a correlative relationship of a difference value between the first and second vehicle speeds with the acceleration, and a correcting module configured to correct the first vehicle speed based on the speed error.

According to another aspect of this disclosure, a method of calculating a vehicle speed is provided. The method of calculating the vehicle speed includes calculating a first vehicle speed based on a vehicle speed pulse count of a vehicle, calculating a second vehicle speed based on positioning signals broadcasted from positioning satellites, acquiring an acceleration detected by an acceleration sensor provided to the vehicle, estimating a speed error based on a correlative relationship of a difference value between the first and second vehicle speeds with the acceleration, and correcting the first vehicle speed based on the speed error.

In these configurations, the speed error of the first vehicle speed caused by acceleration or deceleration of the vehicle can be corrected by using the second vehicle speed. Thus, the vehicle speed can be calculated at high accuracy based on the vehicle speed pulse count even when the vehicle accelerates or decelerates.

BRIEF DESCRIPTION OF THE DRAWING(S)

The present disclosure is illustrated by way of example and not by way of limitation in the figures of the accompanying drawings, in which like reference numerals indicate like elements and in which.

DETAILED DESCRIPTION

Figure 1:
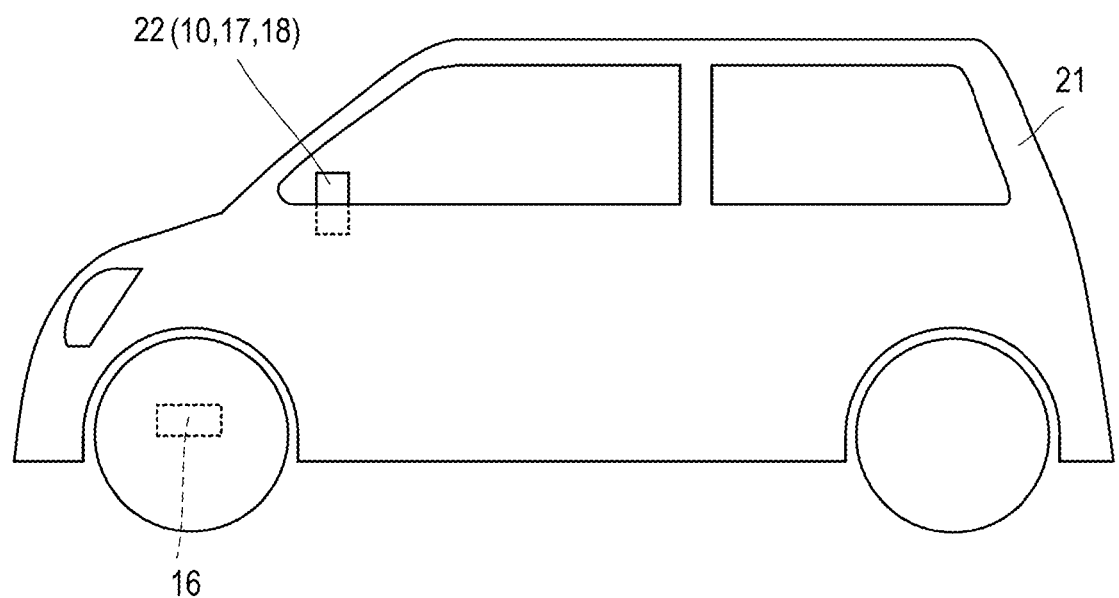
FIG. 1 is a side view schematically illustrating one mode of mounting a vehicle speed calculating device according to one embodiment of this disclosure.

A vehicle speed calculating device 10 according to one embodiment of this disclosure is described. FIG. 1 is a side view schematically illustrating one mode of mounting the vehicle speed calculating device 10, according to this embodiment of this disclosure. The vehicle speed calculating device 10, a wheel speed sensor 16, a GPS receiver 17, and an acceleration sensor 18 are suitably mounted on a vehicle 21. The vehicle 21 is provided with an engine at a front part thereof, and drive force of the engine is transmitted to front wheels of the vehicle 21 by a drive shaft. The wheel speed sensor 16 is attached to the drive shaft, for example. The vehicle speed calculating device 10, the GPS receiver 17, and the acceleration sensor 18 are installed in a car navigation system 22 attached to the vehicle 21, for example.

Figure 2:
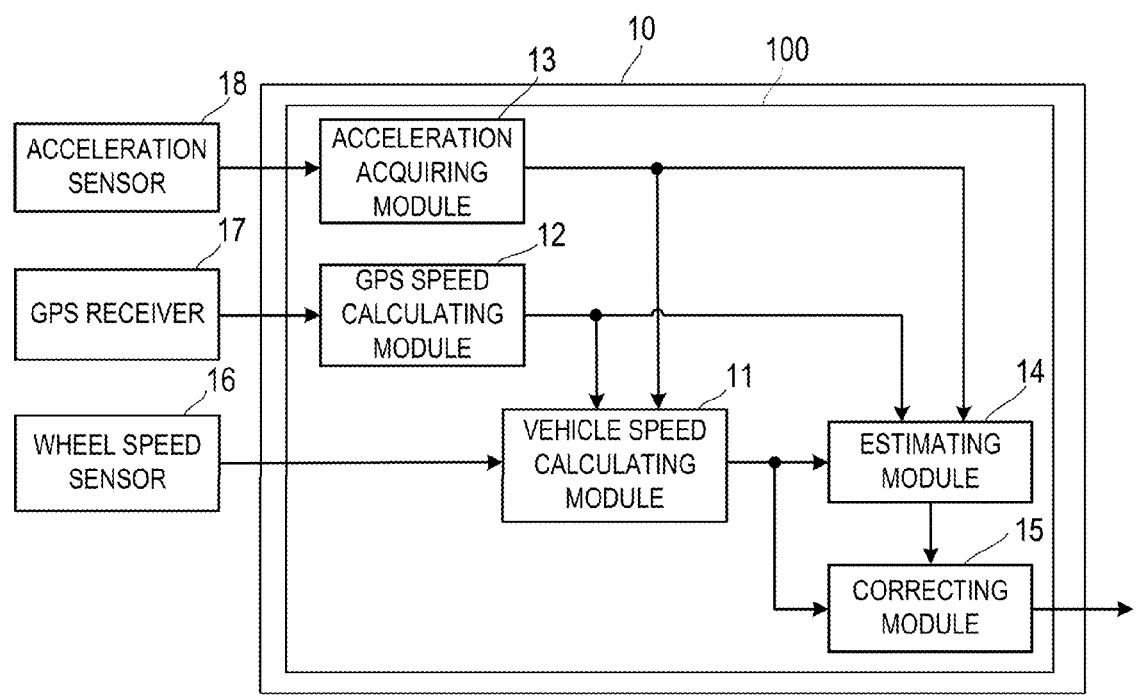
FIG. 2 is a block diagram of the vehicle speed calculating device according to the embodiment.

FIG. 2 is a block diagram of the vehicle speed calculating device 10. The vehicle speed calculating device 10 includes a vehicle speed calculating module 11, a GPS speed calculating module 12, an acceleration acquiring module 13, an estimating module 14, and a correcting module 15. The vehicle speed calculating device 10 is, for example, implemented on a hardware processor 100 (CPU, FPGA) and a memory (not shown in the figures). For example, by having the processor read a program from the memory and execute the program, it is possible to implement the functions of the vehicle speed calculating module 11, the GPS speed calculating module 12, the acceleration acquiring module 13, the estimating module 14, and the correcting module 15. The vehicle speed calculating module 11 may be referred to as the "first vehicle speed calculating module." The GPS speed calculating module 12 may be referred to as the "second vehicle speed calculating module." The wheel speed sensor 16 detects a vehicle speed pulse count per unit time. The GPS receiver 17 receives positioning signals broadcasted from GPS satellites (positioning satellites). The acceleration sensor 18 detects an acceleration of the vehicle 21.

The GPS speed calculating module 12 calculates a speed of the vehicle 21 based on the positioning signals received by the GPS receiver 17. Hereinafter, the calculated value by the GPS speed calculating module 12 is referred to as the GPS-based speed. The GPS-based speed is highly accurate and used for calculating a scale factor and correcting a pulse-based speed (corresponding to the "non-corrected pulse-based speed" below, and may also be referred to as the "first vehicle speed") as described later. The acceleration acquiring module 13 acquires the acceleration detected by the acceleration sensor 18. The GPS-based speed may be referred to as the "second vehicle speed."

The vehicle speed calculating module 11 calculates a speed of the vehicle 21 based on the vehicle speed pulse count detected by the wheel speed sensor 16. Hereinafter, the calculated value by the vehicle speed calculating module 11 is referred to as the non-corrected pulse-based speed. Specifically, the vehicle speed calculating module 11 performs the following processing. The vehicle speed calculating module 11 calculates a scale factor for converting the vehicle speed pulse count into the non-corrected pulse-based speed. The vehicle speed calculating module 11 calculates the scale factor by applying the least squares method to $V_G = Sn$, for example. Here, "$V_G$" is the GPS-based speed, "S" is a coefficient, and "n" is the vehicle speed pulse count per unit time. The estimation value of the coefficient S based on the least squares method becomes the scale factor. The calculation of the scale factor uses data obtained when the vehicle 21 travels at a substantially constant speed, in other words, when the acceleration of the vehicle 21 is below a predetermined threshold. Since the GPS-based speed is highly accurate as described above, the scale factor obtained when the vehicle 21 travels at the substantially constant speed is estimated sufficiently accurately. Further, the vehicle speed calculating module 11 multiplies the scale factor by the vehicle speed pulse count per unit time to calculate the non-corrected pulse-based speed.

Figure 3:
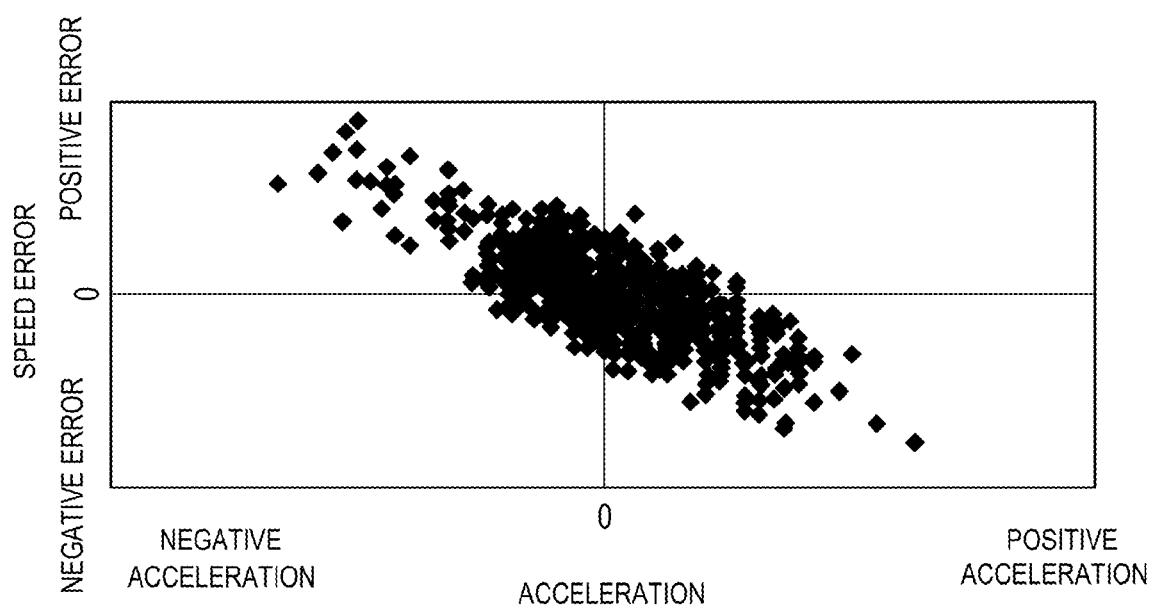
FIG. 3 is a scatter plot illustrating a correlative relationship between a non-corrected speed error and an acceleration of a vehicle.

The estimating module 14 estimates a speed error of the non-corrected pulse-based speed caused by acceleration of the vehicle 21. When the vehicle 21 accelerates or decelerates, the drive shaft may be distorted and/or diameters of the wheels may be varied, and thus a speed error may occur in the non-corrected pulse-based speed. FIG. 3 is a scatter plot illustrating a correlative relationship between a speed error before the correction (non-corrected speed error) and the acceleration of the vehicle 21. Here, in consideration of the GPS-based speed being highly accurate, a difference value obtained by subtracting the GPS-based speed from the non-corrected pulse-based speed is considered as the non-corrected speed error. The speed error is in a negative correlation with the acceleration of the vehicle 21. In a distribution of values of the speed error, the speed error is near 0 (zero) when the acceleration is 0 (zero), and it moves in proportion to the acceleration of the vehicle 21. Further, the speed error changes in proportion to the speed of the vehicle. Therefore, the estimating module 14 estimates the speed error of the non-corrected pulse-based speed based on the following equations.

$$\frac{V_P - V_G}{V_P} = \beta x \quad (1)$$

$$e = \beta_E x V_P \quad (2)$$

Here, "$V_P$" is the non-corrected pulse-based speed, "x" is the acceleration of the vehicle 21, and "β" is a coefficient. Further, "e" is an estimation value of the speed error, and "$\beta_E$" is an estimation value of the coefficient β. The estimation value $\beta_E$ is estimated by applying the least squares method to Equation 1, for example. By using the least squares method, a processing period of time for obtaining the estimation value $\beta_E$ can be shortened. The correcting module 15 corrects the non-corrected pulse-based speed based on $V_E = V_{P-e}$ to calculate a corrected pulse-based speed $V_E$.

Figure 4:
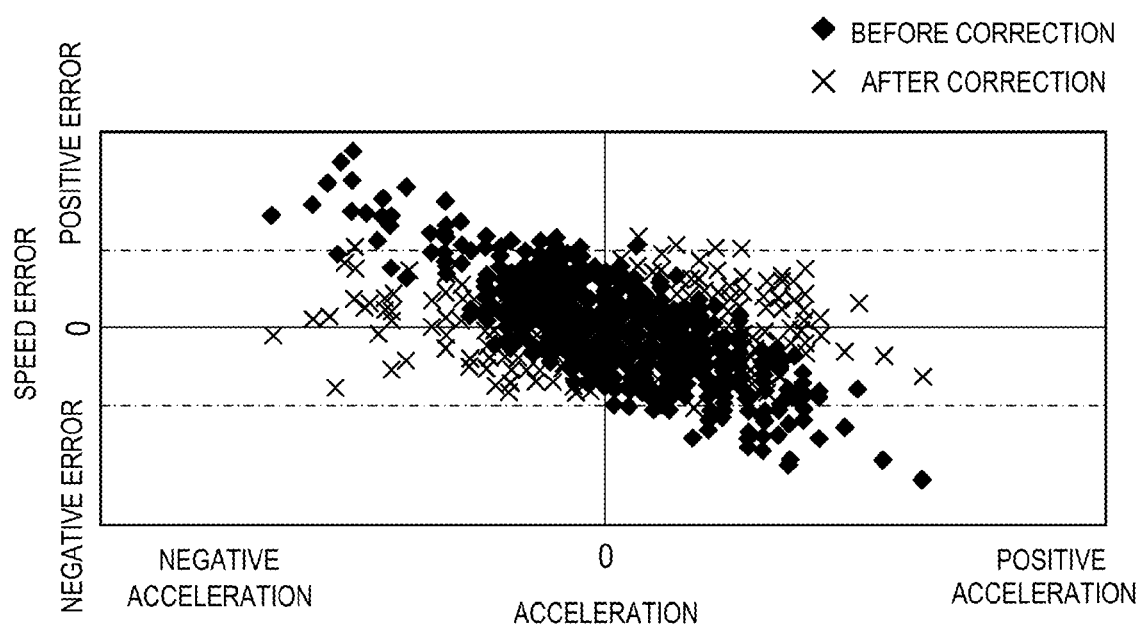
FIG. 4 is a scatter plot illustrating a correlative relationship of the non-corrected speed error and a corrected speed error with the acceleration of the vehicle.

FIG. 4 is a scatter plot illustrating a correlative relationship of the non-corrected speed error and a corrected speed error with the acceleration of the vehicle 21. Here, as described above, the difference value obtained by subtracting the GPS-based speed from the non-corrected pulse-based speed is considered as the non-corrected speed error. A difference value obtained by subtracting the GPS-based speed from the corrected pulse-based speed is considered as the speed error after correction (corrected speed error). Values of the corrected speed error are distributed near "0" regardless of the acceleration of the vehicle 21. In other words, the corrected speed error is not in a correlation with the acceleration of the vehicle 21. The corrected speed error is smaller than the non-corrected speed error within ranges where an absolute value of the acceleration of the vehicle 21 is high. The values of the corrected speed errors scatter less than those of the non-corrected speed error. The values of the corrected speed error are substantially retained to be less than the detection resolution of the pulse-based speed (between the one-dotted chain lines in FIG. 4).

Figure 5:
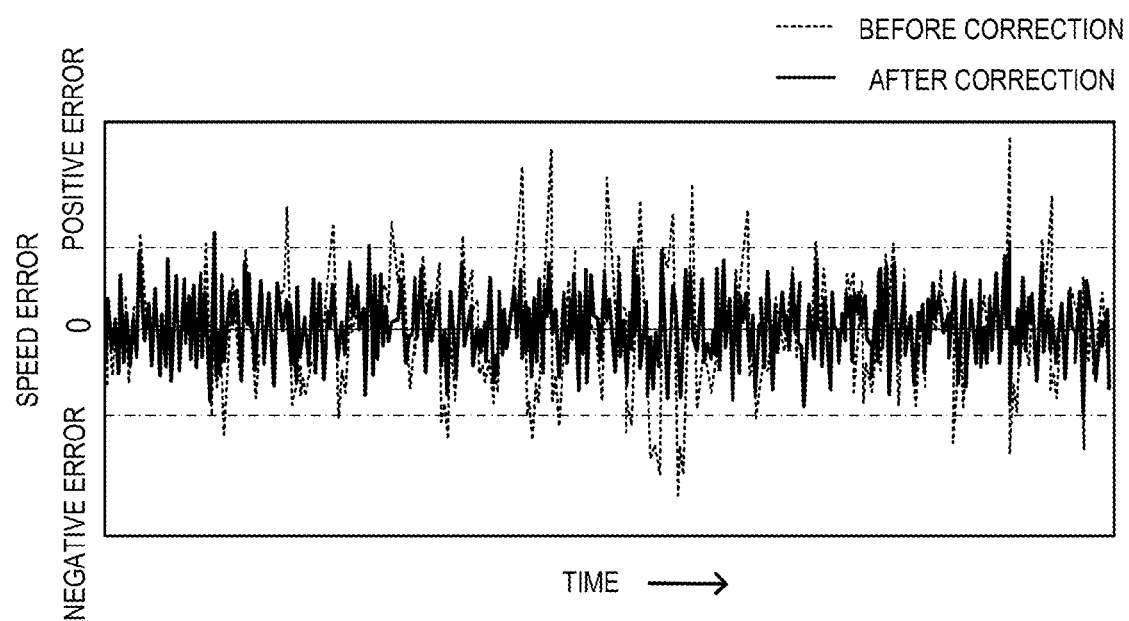
FIG. 5 is a chronological chart of the non-corrected and corrected speed errors.

FIG. 5 is a chronological chart of the non-corrected and corrected speed errors. The solid line indicates the corrected speed error, and the dashed line indicates the non-corrected speed error. Variation of the corrected speed error is smaller than that of the non-corrected speed error. The values of the corrected speed error are substantially retained to be less than the detection resolution of the pulse-based speed (between the one-dotted chain lines in FIG. 5).

Figure 6:
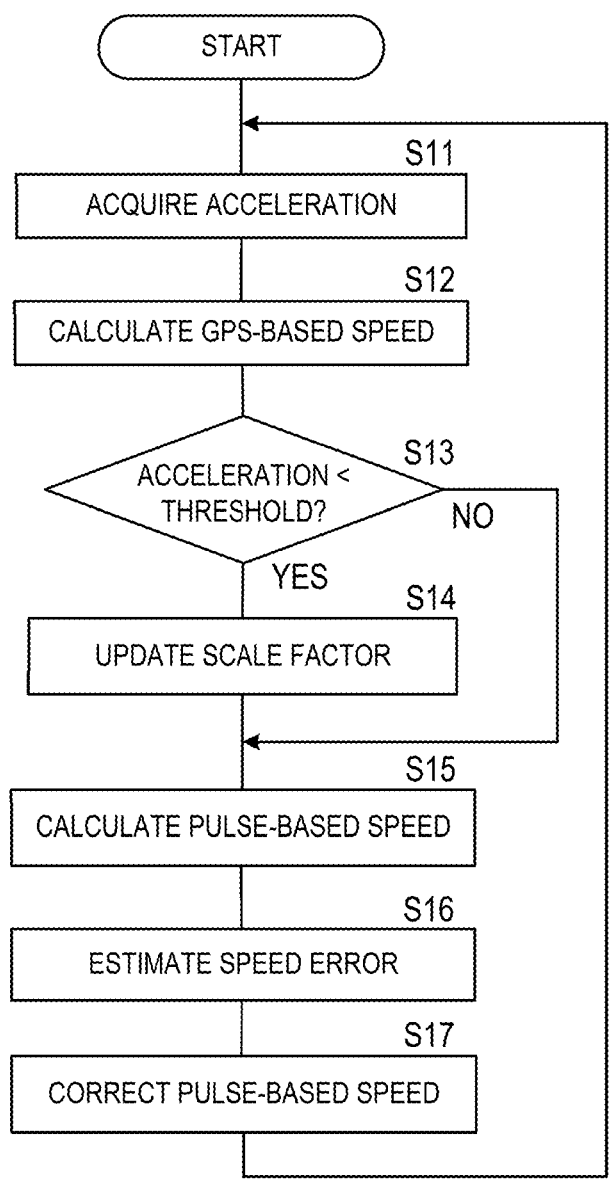
FIG. 6 is a flowchart illustrating operation of the vehicle speed calculating device according to the embodiment.

FIG. 6 is a flowchart illustrating operation of the vehicle speed calculating device 10. The acceleration acquiring module 13 (see FIG. 2) acquires the acceleration detected by the acceleration sensor 18 (S11). The GPS speed calculating module 12 calculates the GPS-based speed based on the positioning signals broadcasted from the GPS satellites (S12). When the acceleration of the vehicle 21 is below the threshold (S13: YES), the vehicle speed calculating module 11 updates the scale factor (S14). When the acceleration of the vehicle is the threshold or above (S13: NO), the vehicle speed calculating module 11 does not update the scale factor. Next, the vehicle speed calculating module 11 calculates the non-corrected pulse-based speed based on the vehicle speed pulse count of the vehicle 21 (S15). The estimating module 14 estimates the speed error of the non-corrected pulse-based speed by estimating the coefficient β in Equation 1 (S16). The correcting module 15 corrects the pulse-based speed by using the estimation value of the speed error (S17). The vehicle speed calculating device 10 repeats the above operation unless interrupted. In this manner, the estimating module 14 updates the estimation value $\beta_E$ sequentially while the vehicle 21 travels. Thus, the accuracy of the corrected pulse-based speed can constantly be kept high.

In this embodiment, the speed error of the non-corrected pulse-based speed is approximated by the linear equation of the acceleration of the vehicle 21, and the coefficient β of the linear equation is estimated by the least squares method. Thus, the speed error of the pulse-based speed caused by acceleration or deceleration of the vehicle 21 can be corrected. Therefore, the accuracy of the speed of the vehicle 21 obtained based on the vehicle speed pulse count can be improved.

Note that in this embodiment, the speed error is approximated by the linear equation of the acceleration of the vehicle 21; however, this disclosure is not limited to this. In this disclosure, when a desirable standard deviation cannot be obtained by the approximation based on the linear equation, the speed error may be approximated by a polynomial equation of the acceleration of the vehicle or an arbitrary function of the acceleration of the vehicle. Further in this disclosure, when it is difficult to approximate a speed error for a vehicle of a certain type by a function of an acceleration of the vehicle, the speed error may be calculated based on a table indicating a correspondence relationship between the acceleration and the speed error for the vehicle of the corresponding type. This table may be stored in the vehicle speed calculating device in advance or acquired by calibration.

Further in this embodiment, the coefficient β is estimated by the least squares method; however, this disclosure is not limited to this. In this disclosure, the coefficient β may be estimated by an estimating method conventionally used for regression analysis.

Further in this embodiment, the scale factor and the estimation value $\beta_E$ are updated sequentially; however, this disclosure is not limited to this. In this disclosure, the scale factor and the estimation value $\beta_E$ calculated when the traveling of the vehicle is started may be continuously used. Thus, calculation load on the vehicle speed calculating device can be reduced.

Moreover, the vehicle speed calculating device 10 of this embodiment is mounted on the vehicle 21 that is front-wheel drive; however, without limiting to this, the vehicle speed calculating device of this disclosure may be mounted on a rear-wheel drive vehicle. Although a front-wheel drive vehicle and a rear-wheel drive vehicle generally have different correlations between the speed error and the acceleration of the vehicle, even in the case of the rear-wheel drive vehicle, the pulse-based speed can be corrected by using a similar method to the case of the front-wheel drive vehicle.

Furthermore, the vehicle speed calculating device 10 of this embodiment calculates the speed of the vehicle 21; however, the vehicle speed calculating device 10 may additionally calculate a position of the vehicle 21 based on an azimuth detected by, for example, a gyroscope and the speed of the vehicle 21.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A vehicle speed calculating device, comprising:
a hardware processor programmed to at least:
calculate a plurality of first vehicle speeds based on a plurality of vehicle speed pulse counts of a vehicle,
calculate a plurality of second vehicle speeds based on positioning signals broadcasted from positioning satellites,
acquire a plurality of accelerations detected by an acceleration sensor provided to the vehicle,
estimate a plurality of speed errors based on a correlative relationship of a plurality of difference values between the first and second vehicle speeds with the accelerations, and
correct the first vehicle speeds based on the speed errors.

2. The vehicle speed calculating device of claim 1, wherein the hardware processor is further programmed to at least:
estimate the plurality of speed errors by approximating a plurality of predetermined values by a linear equation of the accelerations and estimating a coefficient of the linear equation, the predetermined values obtained by dividing the difference values by the first vehicle speeds.

3. The vehicle speed calculating device of claim 2, wherein the hardware processor is further programmed to at least:
sequentially update an estimation value of the coefficient of the linear equation while the vehicle travels.

4. The vehicle speed calculating device of claim 3, wherein the hardware processor is further programmed to at least:
estimate the coefficient of the linear equation by using the least squares method.

5. The vehicle speed calculating device of claim 2, wherein the hardware processor is further programmed to at least:
estimate the coefficient of the linear equation by using the least squares method.

6. A method of calculating a vehicle speed, comprising:
calculating a plurality of first vehicle speeds based on a plurality of vehicle speed pulse counts of a vehicle;

calculating a plurality of second vehicle speeds based on positioning signals broadcasted from positioning satellites;

acquiring a plurality of accelerations detected by an acceleration sensor provided to the vehicle;

estimating a plurality of speed errors based on a correlative relationship of a plurality of difference values between the first and second vehicle speeds with the accelerations; and correcting the first vehicle speeds based on the speed errors.

* * * * *